United States Patent [19]

Fouad et al.

[11] Patent Number: 4,631,471
[45] Date of Patent: Dec. 23, 1986

[54] INDUCTOR APPARATUS FOR APPLICATION OF FERRORESONANT REGULATORS

[75] Inventors: Fakhry A. Fouad, Morristown; Robert J. Kakalec, Madison; Henry E. Menkes, Pine Brook, all of N.J.

[73] Assignee: AT&T Bell Laboratories, Murray Hill, N.J.

[21] Appl. No.: 715,366

[22] Filed: Mar. 25, 1985

[51] Int. Cl.$^4$ ............................................. G05F 1/70
[52] U.S. Cl. ..................... 323/306; 323/355; 363/40; 363/75; 363/90; 336/184
[58] Field of Search ............. 323/306, 307, 308, 309, 323/355; 363/27, 28, 40, 75, 90, 91; 336/184

[56] References Cited

U.S. PATENT DOCUMENTS

| Re. 27,916 | 2/1974 | Kakalec | 323/248 |
|---|---|---|---|
| 2,694,177 | 11/1954 | Sola | 323/308 |
| 3,361,956 | 1/1968 | Sola | 336/184 |
| 4,010,381 | 3/1977 | Fickenscher | 307/66 |
| 4,045,717 | 8/1977 | Fallon et al. | 323/306 |
| 4,156,175 | 5/1979 | Nissan | 363/75 |
| 4,366,532 | 12/1982 | Rosa et al. | 363/90 |

FOREIGN PATENT DOCUMENTS 1206078 11/1965 Fed. Rep. of Germany ...... 336/184

*Primary Examiner*—Patrick R. Salce
*Assistant Examiner*—Anita M. Ault
*Attorney, Agent, or Firm*—Alfred G. Steinmetz

[57] ABSTRACT

An inductor structure is combined with a ferroresonant regulator as a filter inductor in one instance, and as a regulating inductor in another. In one example, a ferroresonant voltage regulator includes a pair of shunt filters at its output to reduce the low order odd harmonic content of the AC output. The filtering arrangement includes two LC shunt filters having their independent inductor windings wound on a single magnetic core unit. Auxiliary windings coupled to each of the inductor windings are placed in series with the output to buck any remaining harmonics.

In a second instance, independent regulating inductors in a multiphase ferroresonant regulator are also realized on a single magnetic structure.

8 Claims, 3 Drawing Figures

INDUCTOR APPARATUS FOR APPLICATION OF FERRORESONANT REGULATORS

BACKGROUND OF THE INVENTION

This invention relates to inductor apparatus and its application to ferroresonant regulators or constant voltage transformers. It is specifically concerned in one instance with a ferroresonant regulator with a shunt type tuned harmonic filter having plural inductors arranged on a unitary magnetic structure. In another instance, it is concerned with plural regulating inductors on a single magnetic structure for a multiphase controlled ferroresonant regulator.

The energy storage requirements of most inductor applications has generally dictated that each inductor winding be wound on a separate and independent magnetic core. In applications requiring a plurality of inductors, this requirement of a separate core for each inductor considerably increases the physical dimensions and overall weight of electrical equipment compared with those values if the same inductive effect could be achieved with fewer magnetic cores than inductors. One such instance is the output filter for a ferroresonant regulator.

The AC output voltage of a ferroresonant regulator normally includes a significant level of lower order harmonics. The third harmonic alone may have a magnitude as great as 25% of the output voltage. An AC output that is relatively free of harmonics is desirable, since it permits the ferroresonant regulator to operate more efficiently and be more stable in operation over a wider range of input voltage variation. Unless the output is applied to a harmonic reduction filter, the existence of these harmonics may damage load components which are energized directly by the AC output of the ferroresonant regulator.

It is common to use inductive type filters to reduce these harmonics in the AC output when an AC output signal is desired. One common harmonic reduction circuit uses an LC filter shunting the output, which is tuned to the third harmonic. This assures that the output is relatively free of third harmonics, but the fifth and seventh harmonic components can still represent a substantial portion of the output voltage.

In some applications requiring a very small harmonic content in the output, the output terminal is shunted by three separate harmonic filters tuned to the third, fifth and seventh harmonics, respectively. This, however, results in a bulky physical structure since three separate inductor cores are required. Use of a single unit, three leg core has proved impractical because of magnetic coupling between the three windings.

Another arrangement disclosed in U.S. Pat. No. 2,694,177 issued to J. Sola, Nov. 9, 1954, avoids the need for a separate magnetic structure for the inductor by providing a separate magnetic path on the basic ferroresonant magnetic structure of the transformer. This arrangement, however, requires an extra set of shunts for the ferroresonant transformer core and complicates the design of the ferroresonant transformer. This becomes even less desirable when a particular transformer design must be capable of accommodating a wide range of output loads. Additionally, in some instances, the shunts may not be sufficient to achieve the desired inductance.

SUMMARY OF THE INVENTION

A ferroresonant voltage regulator included in a UPS includes a tuned harmonic filter to significantly reduce the low order odd harmonics from an AC output. Two tuned LC shunt filters tuned to different harmonics are connected in parallel across the output. Each individual filter has an inductor with a secondary winding. These secondary windings are series connected with each other and with the output terminal path of the regulator to further buck and cancel harmonic signals. These inductors and their secondary windings are all wound on a unitary magnetic core structure which is designed to minimize magnetic coupling between the two inductor windings, and hence, permit the two LC filters to independently respond to the third and sixth harmonics of the AC output signal and provide a filtering bandwidth sufficient to significantly reduce the third, fifth and seventh harmonics.

BRIEF DESCRITION OF THE DRAWINGS

An understanding of the invention may be readily attained by reference to the following specification and the accompanying drawings in which:

FIG. 1 is a schematic of a ferroresonant regulator utilized in an uninterruptible power supply arrangement and including harmonic filtering in the output embodying the principles of the invention; and FIG. 2 is a perspective view of an embodiment of an inductor of the physical structure of the harmonic reduction filter; and FIG. 3 is a schematic of a multiphase ferroresonant regulator arrangement in which the regulating inductors for each phase are wound on a single magnetic structure according to the principles of the invention.

DETAILED DESCRIPTION

Figure 1:
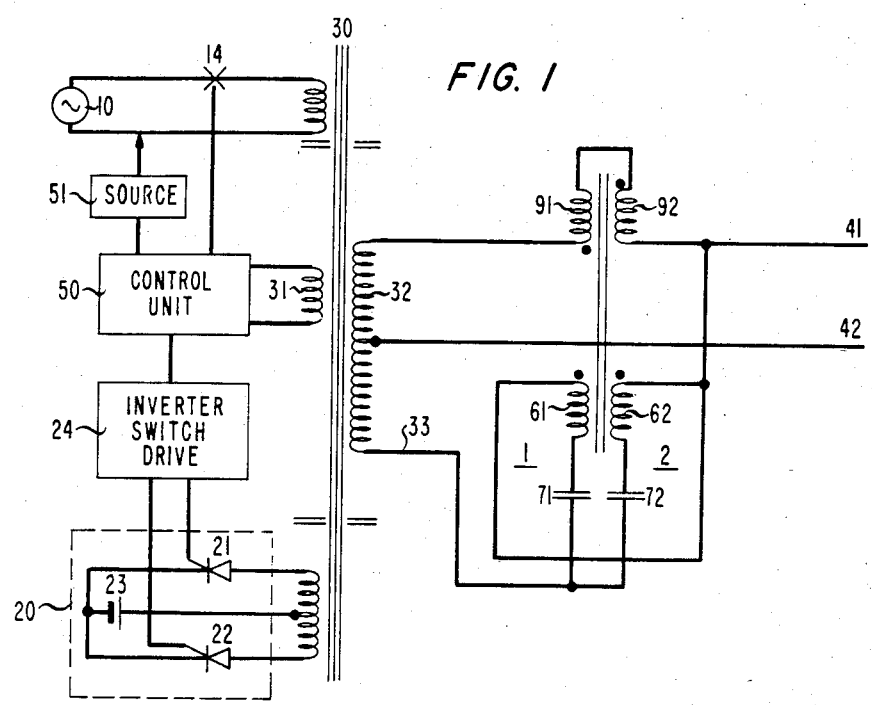

An uninterruptible power supply including a ferroresonant regulating transformer is shown in FIG. 1. It has two independent input power sources; one an AC line source 10; the other a battery powered inverter circuit 20. Normally when the AC line signal is acceptable, it supplies power through a ferroresonant regulating transformer 30 to the output terminals 41 and 42. If it is unacceptable, it is disconnected from the regulating transformer 30 by opening line switch 14, and the inverter 20 subsequently supplies all the power to the output.

The uninterruptible power supply (UPS) operates under the direction of a central control unit 50, which determines the particular mode of operation of the UPS. The normal mode of operation is one in which power applied to the output is derived solely from the AC line. The control circuit 50 continuously monitors the line signal for proper frequency and amplitude. During this normal mode of operation, the inverter 20 is operated in an idling mode. Its switching devices 21 and 22 are continuously operating, but the signal phase of the inverter signal relative to the output signal is controlled by the control unit 50 and the inverter drive 24 so that it delivers no power to the output. The control unit 50 accomplishes this by monitoring the phase of the output signal through winding 31 and controlling through the inverter drive 24 to have the inverter output signal substantially in phase with the output signal.

If the AC signal is deemed unacceptable, the AC line 10 is disconnected from the regulating transformer 30 by the control unit 50 by opening a line switch 14, and the inverter 20 runs freely under inverter switch drive 24 and now supplies all the power from its battery 23 to the output terminals 41 and 42. An uninterruptible power supply utilizing a two input single output ferroresonant regulator and this particular mode of operation has been disclosed by H. Fickenscher et al. in U.S. Pat. No. 4,010,381, issued Mar. 1, 1977 and which is assigned to the same assignee as the present application. Further details may be ascertained by referring to the referenced Fickenscher disclosure.

The AC output of the secondary winding 32 includes harmonic components which comprise a significant part of the output power. These harmonics may damage or unduly stress electrical components coupled to the output, and hence, an output filter arrangement is included to suppress selected low order odd components of these harmonics.

The overall filter circuit includes two inductor windings 61 and 62, each connected in series with a capacitor 71 and 72. The two capacitors 71 and 72 represent in addition the conventional ferroresonant resonating capacitor which is now divided into two separate capacitor devices 71 and 72, included in the two LC filters, respectively. Each series connection of an inductor winding and a capacitor comprising individual shunt filters 1 and 2 is connected across the output terminal 41 and terminal 33 of the regulator's secondary winding 32. Each inductor winding 71 and 72 is further coupled to an auxiliary or a secondary winding 91 and 92, respectively. These secondary windings 91 and 92 are further connected in series with each other and with the output terminal 41 and are operative to buck the harmonics supplied by the regulator's secondary winding 32 and complement the action of the shunt filters to further suppress these harmonics. The first and second shunt filter circuits 1 and 2 are tuned to the third and sixth harmonics of the fundamental of the output signal, respectively. The combined effect of these two shunt filters has a combined bandwidth wide enough to effectively suppress the third, fifth and seventh harmonics of the output signal. The added harmonic content of the voltage of the secondary winding 32 of the regulator appears mostly across the inductor windings 61, 62, 91 and 92, and very little appears at the output terminals 41 and 42.

As indicated above, these capacitors 71 and 72, in the two shunt filters 1 and 2, also represent the resonating capacitance of the ferroresonant regulator as divided into two separate capacitor devices which also double as filter capacitors of the two LC shunt filters 1 and 2. Since the value of the resonating capacitance is determined by the requirements of the ferroresonant regulator, the related values of the inductor reactance and the division of the resonating capacitor into two separate devices is dependent upon the frequency of operation and the particular harmonics to be suppressed, namely, the third and sixth harmonic which establish a bandwidth of filtering found uniquely effectively in this particular arrangement to suppress the third, fifth and seventh harmonics as desired. The particular values of inductive reactance and capacitive reactance may be determined in accord with the following nonlinear equation which defines their relative values.

$$\omega^4 L_1 C_1 L_2 C_2 (1-k^2) - \omega^2 (L_1 C_1 + L_2 C_2) + 1 = 0;$$

where $\omega$ is the harmonic frequency of interest in rad/sec, k is the winding coupling factor depending upon the geometry of the magnetic structure, $C_1$ and $C_2$ are the values of the two capacitors 71 and 72 derived from the resonating capacitance, and $L_1$ and $L_2$ are the values of the two inductors 61 and 62. The equation is solved in the illustrative embodiment by setting up two independent equations for the third and sixth harmonics respectively in terms of $L_1$ and $L_2$ which yields the two equations which are iteratively solved for the two unknowns $L_1$, $L_2$. The value of coupling coefficient k must be less than 0.5 to permit the two nonlinear equations to converge to a realizable solution.

As indicated above, the two inductor windings 61 and 62 must be substantially independent of each other and yet be wound on a single magnetic structure.

Figure 2:
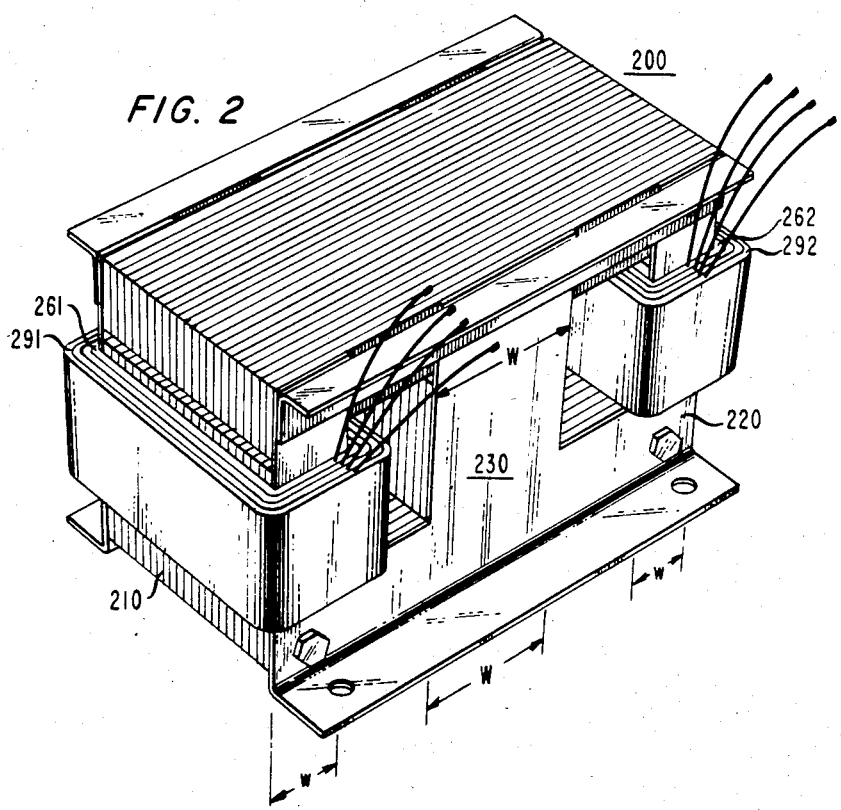

The magnetic core structure assembly for the inductor winding, as shown in FIG. 2, comprises a stacked array of EI laminations forming a three leg core structure 200. In order to operate effectively as a shunt filter, the two inductor windings 261 and 262, and their associated secondary windings 291 and 292, must be substantially effectively isolated magnetically from one another. Hence, inductor windings 261 and 262 and associated secondary windings 291 and 292 are wound on the outer legs 210 and 220 of the core structure. To minimize the coupling between the two windings, a cross sectional area of the center leg 230 of the core is dimensioned to at least exceed a cross sectional area of each of the outer legs 210 and 220 in area by a factor of at least two. This increase in area of the central core leg in the illustrative embodiment is achieved by making a width W of the center leg 230 twice a corresponding width w of the outer legs while the depth d of all legs is equal. This has been found to provide an inductive coupling of less than 0.3, which is sufficient to allow the two filters to operate in a stable mode and substantially independently of each other. It is apparent that this unique core structure arrangement permits implementation of a filter circuit capable of significantly suppressing the three low order odd harmonics with a single magnetic core structure providing considerable reduction in cost weight and volume of the overall power supply unit.

Figure 3:
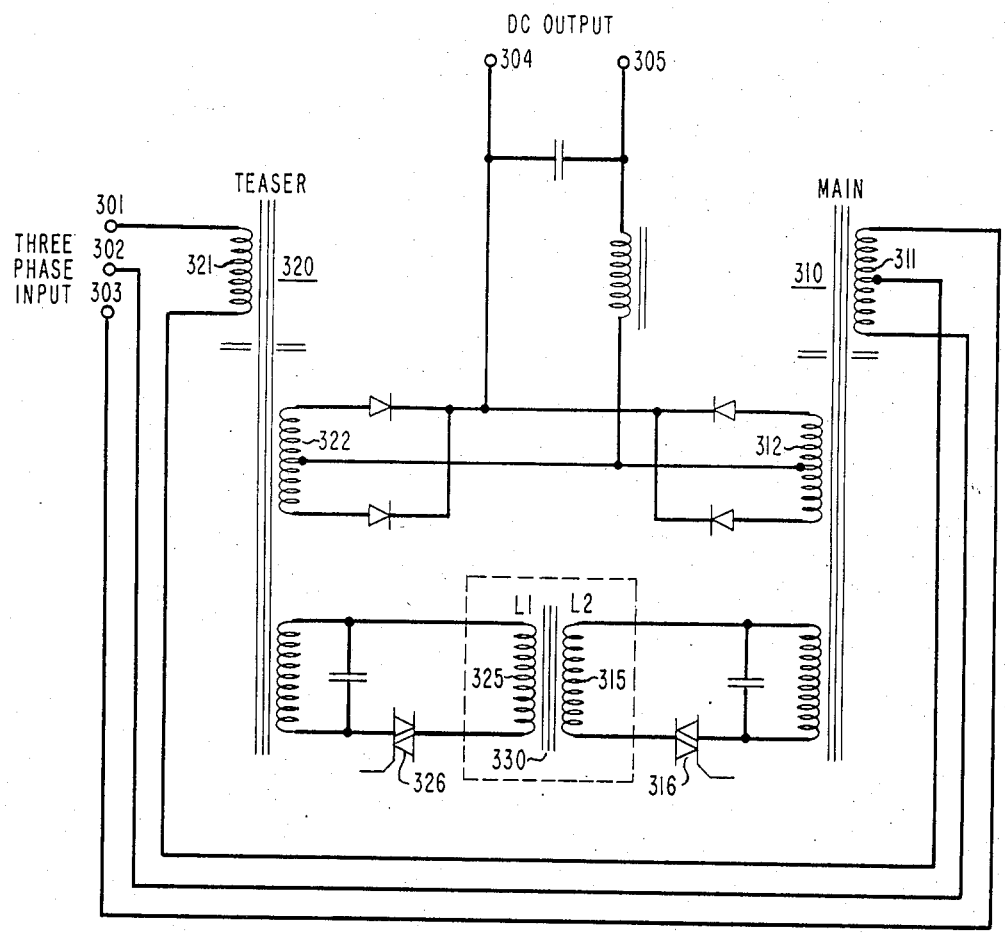

While the above description pertains to a filter arrangement for a ferroresonant regulator, it is readily apparent that this advance may be utilized in many other applications. An example of such an application is a multiphase controlled ferroresonant regulator such as is shown in FIG. 3 wherein a regulating inductor must be switched into and out of the circuit in each phase. In this instance, the regulating inductor for each individual phase may all share a common magnetic core. The example shown in FIG. 3 is a Scott T connection of two single phase controlled ferroresonant regulators to convert a three phase input into a regulated two phase output. The two regulating inductors for each output phase are constructed on the same core structure.

The particular embodiment shown in FIG. 3 shows the main core 310 and auxiliary core 320 of a Scott T transformer connection and the two associated input windings 311 and 321. The three phase input is applied to the center tapped main winding 311. One phase of the input and one end terminal of winding 311 is applied to winding 321, which in Scott T terminology is known as the teaser winding. It converts the three phase input of terminals 301, 302 and 303 into a two phase output on output windings 312 and 322. These two outputs are rectified in parallel and supplied as a DC voltage at output terminals 304 and 305. Regulation is controlled by using the controlled ferroresonant techniques such as disclosed in U.S. Pat. No. Re. 27,916 issued to R. J. Kakalec, Feb. 12, 1974, and assigned to the same assignee as this application. As disclosed therein, output voltages are regulated by simulating saturation of the transformer by switching an inductor device into a connection with the ferro-capacitor and regulating winding in response to a voltage error detection circuit. Accordingly as shown in FIG. 3, each output phase includes a regulating inductor 315 and 325 and a triac switch 316 and 326 controlled by a voltage error detection circuit which is not disclosed. In accord with the principles of the invention, the two regulating inductors 315 and 325 share a single magnetic core 330 similar to the core structure of FIG. 2 but which does not contain any secondary windings. This arrangement significantly reduces the size and weight of the overall circuit.

What is claimed is:

1. In combination:
a multiphase ferroresonant regulator,
an inductor structure combined with the multiphase ferroresonant regulator and accommodating at least two substantially independent self-inductive reactances which are utilized as independent regulation inductors for at least a first and second phase of the multiphase ferroresonant regulator, the inductor structure comprising;
a two window magnetic core including first and second outer legs and a center leg between the first and second outer legs,
a first inductor winding wound on the first outer leg,
a second inductor winding wound on the second outer leg, and
the center leg having a cross sectional area equaling a combined cross sectional area of the first and second outer legs,
whereby the coupling between the first and second inductor windings is less than one-half.

2. A combination as defined in claim 1 wherein the first and second filters are tuned to a third and sixth harmonic of a fundamental frequency of an output signal whereby an overall filtering bandwidth is established to significantly reduce amplitudes of third, fifth and seventh harmonics.

3. In combination:
an inductor structure and a ferroresonant regulator, the ferroresonant regulator comprising,
a transformer including:
at least one input winding to accept a source of power,
an output winding coupled to an output terminal for coupling to a load, and
harmonic filtering circuitry including:
the inductor structure comprising a magnetic core comprising
a three parallel leg arrangement with first and second outer legs and a center leg in between all legs being coupled by yokes at opposite ends of the legs,
a first and second inductor winding being wound on the first and second outer legs respictivley, and
the center leg having a cross sectional area at least twice that of one of the first and second legs,
a resonating capacitance of the regulator being embodied into first and second discrete capacitive devices,
a first shunt filter shunting the output terminal including the first inductor winding and the first discrete capacitance device connected in series,
the first shunt filter being tuned to a third harmonic of the fundamental frequency of an output signal of the regulator, and
a second shunt filter shunting the output terminal and including the second inductor winding and the second discrete capacitive device connected in series,
the second shunt filter being tuned to a sixth harmonic of the fundamental frequency of an output signal of the regulator,
a first auxiliary winding closely coupled to the first inductive winding,
a second auxiliary winding closely coupled to the second inductive winding,
the first and second auxiliary winding being connected in series with each other and with the output terminal, and
the first and second inductor windings being substantially magnetically decoupled from each other,
inductance of the first and second inductor windings and capacitance of the first and second capacitor devices are related by an expression:

$$\omega^4 L_1 C_1 L_2 C_2 (1-k^2) - \omega^2 (L_1 C_1 + L_2 C_2) + 1 = 0$$

where
$L_1$ and $L_2$ is an inductance of the first and second inductor windings,
$C_1$ and $C_2$ is a capacitance of the first and second capacitive devices,
$\omega$ is a harmonic frequency in rad/sec, and
$k$ is a winding coupling factor between the first and second inductor windings.

4. In combination:
a ferroresonant regulator comprising:
a transformer including:
at least one input winding to accept a source of power,
an output winding coupled to an output terminal for coupling to a load, and
harmonic filtering circuitry interconnecting the output winding to the output terminal and comprising;
an inductor structure accommodating at least two substantially independent self-inductive reactances including
a two window magnetic core including first and second outer legs and a center leg between the first and second outer legs,
a first inductor winding wound on the first outer leg,
a second inductor winding wound on the second outer leg, and
the center leg having a cross sectional area equaling at least a combined cross sectional area of the first and second outer legs,
magnetic coupling between the first and second inductor windings being less than one half
a resonating capacitance of the regulator being embodied into first and second discrete capacitive devices,
a first shunt filter shunting the output terminal including the first inductor winding and the first discrete capacitance device connected in series, and
a second shunt filter shunting the output terminal and including the second inductor winding and the second discrete capacitive device connected in series.

5. A magnetic structure for accommodating a pair of inductor windings for use in independent harmonic filters in an output of a regulating transformer, comprising;

a magnetic core comprising a first outer leg, a second outer leg and a center leg between the first and second outer legs and defining first and second windows, the center leg having a cross sectional area at least equaling a sum of cross sectional areas of the first and second outer legs, a first inductor winding wound onto the first outer leg, a second inductor winding wound on the second outer leg, magnetic coupling between the first and second inductor winding being less than one half, a first capacitor connected in series with the first inductor winding, a second capacitor connected in series with the second inductor winding, a series connection of the first inductor winding and the first capacitor connected as a shunt filter in the output of the regulating transformer, and a series connection of the second inductor winding and the second capacitor connected as a shunt filter in the output of the regulating transformer.

6. A combination as defined in claim 4 or 5 and further including a first auxiliary winding wound on the first outer leg and closely coupled to the first inductor winding, a second auxiliary winding wound on the second outer leg and closely coupled to the second inductor winding, the first and second auxiliary windings being connected in series with each other and with the output terminal.

7. A combination as defined in claim 5 wherein:

the first series connection is resonantly tuned to a third harmonic at a fundamental frequency at an output signal at the regulating transformer, and the second series connector is resonantly tuned to a sixth harmonic at a fundamental frequency at an output signal at the regulating transformer.

8. In combination:

an inductor structure and a ferroresonant regulator comprising:

the ferroresonant regulator having a three phase input, a two phase output, and a Scott T transformer structure coupling the input to the output;

at least a first and second control winding and a first and second resonating capacitor connected to the first and second control winding respectively, the inductor structure including first and second inductor windings and a magnetic core structure comprising two outer legs having an identical cross sectional area and a central leg having a cross sectional area twice that of the identical cross sectional area, the first and second inductor windings being wound on the first and second outer legs respectively, and first and second controllable switches for selectively coupling the first and second inductor windings to the first and second control windings respectively.

* * * * *